US 6,712,391 B2

(12) United States Patent
Cheng

(10) Patent No.: US 6,712,391 B2
(45) Date of Patent: Mar. 30, 2004

(54) ADJUSTABLE STEERING ASSEMBLY FOR AN ELECTRICAL SCOOTER

(75) Inventor: Ming-Chuan Cheng, Taichung (TW)

(73) Assignee: Merits Health Products Co., Ltd., Taichung (TW)

( * ) Notice: Subject to any disclaimer, the term of this patent is extended or adjusted under 35 U.S.C. 154(b) by 15 days.

(21) Appl. No.: 10/100,881

(22) Filed: Mar. 19, 2002

(65) Prior Publication Data

US 2003/0001374 A1 Jan. 2, 2003

Related U.S. Application Data

(63) Continuation-in-part of application No. 09/897,867, filed on Jul. 2, 2001, now abandoned.

(51) Int. Cl.[7] .................................................. B62D 1/18
(52) U.S. Cl. ...................................................... 280/775
(58) Field of Search ................................ 280/775, 779; 74/493

(56) References Cited

U.S. PATENT DOCUMENTS

| 4,209,074 A | * | 6/1980 | York | 180/78 |
| 4,580,647 A | * | 4/1986 | Peifer et al. | 180/78 |
| 4,682,787 A | * | 7/1987 | Ruhter et al. | 280/775 |
| 4,706,776 A | * | 11/1987 | Hyoki et al. | 180/334 |
| 4,733,745 A | * | 3/1988 | Lumpkins | 180/315 |
| 4,821,837 A | * | 4/1989 | Fifer | 180/334 |
| 4,934,737 A | * | 6/1990 | Nakatsuka | 280/775 |
| 5,439,252 A | * | 8/1995 | Oxley et al. | 280/775 |
| 5,449,199 A | * | 9/1995 | Heinrichs et al. | 280/775 |
| 5,632,353 A | * | 5/1997 | Kimberley | 180/326 |
| 6,176,337 B1 | * | 1/2001 | McConnell et al. | 180/208 |

* cited by examiner

Primary Examiner—Paul N. Dickson
Assistant Examiner—Faye M. Fleming
(74) Attorney, Agent, or Firm—William E. Pelton, Esq.

(57) ABSTRACT

A steering assembly for an electrical scooter has a base, a connecting tube, a front steering bar, a rear steering bar, a positioning device, a frame and a handle. The front steering bar and the rear steering bar are pivotally attached to the top of the base. The positioning device is pivotally mounted between the front steering bar and the rear steering bar to keep the front steering bar and the rear steering from pivoting relative to the base. The frame is pivotally connected to the top of the front steering and the top of the rear steering bar. A headlight is attached to the frame. The front steering bar has a length longer than that of the rear steering bar. Accordingly, the steering assembly is adjustable, and the projecting angle of the light can be controlled to a desired range.

1 Claim, 6 Drawing Sheets

ADJUSTABLE STEERING ASSEMBLY FOR AN ELECTRICAL SCOOTER

This is a continuation-in-part divisional of application Ser. No. 09/897,867 filed Jul. 2, 2001 now abandoned.

BACKGROUND OF THE INVENTION

1. Field of the Invention
2. Description of Related Art

An electrical scooter is used to help a person to move from place to place. The conventional electrical scooter substantially comprises a body, at least one front wheel, two rear wheels, a seat, an electrical actuator and a steering bar. Each front wheel is rotatably mounted on the front end of the body. Each rear wheel is rotatably mounted on the rear end of the body. The seat is mounted on the body for a user to sit. The electrical prime mover like an electrical motor is mounted on the body to drive the rear wheels. Consequently, the scooter can move at a low speed and help the user to move to a desired location. The steering bar is pivotally mounted on the front end of the body and is connected to each front wheel. Accordingly, the user can control the direction of the electrical scooter by means of pivotally rotating the steering bar relative to the body. A headlight is secured on the steering bar so the electrical scooter can be driven in the dark.

In addition, the steering bar is always designed to be able to pivot relative to the base, such that the position of the handle on the bar can be adjusted for different users. However, when the steering bar rotates relative to the base, the angle of the light projected from the headlight is also changed. When the steering bar is rotated too close to the user, the headlight will rotate with the steering bar and project upward relative to the horizon. The light will turn into the sky, and the light does not illuminate the path of the scooter whereby there is an obvious inconvenience and danger caused.

To overcome the shortcomings, the present invention tends to provide an improved steering assembly to mitigate or obviate the aforementioned problems.

SUMMARY OF THE INVENTION

The main objective of the invention is to provide an improved steering assembly that can be adjusted relative to the body of an electrical scooter. The steering assembly has a base, a connecting tube, a front steering bar, a rear steering bar, a positioning device, a frame and a handle. The connecting tube is secured to the bottom of the base and connected to a front wheel of the electrical scooter. The front steering bar is pivotally attached to the top of the base and extends upward from the base. The rear steering bar is pivotally attached to the top of the base and extends upward from the base. The positioning device is mounted between the front steering bar and the rear steering bar to keep the front steering bar and the rear steering bar from rotating relative to the base. The frame is pivotally connected to the top of the front steering bar and the top of the rear steering bar. The handle is laterally secured to the frame. A headlight is secured to the frame. With such an arrangement, the steering assembly can pivot relative to the body of the electrical scooter after releasing the positioning device. The position of the handle is adjustable and thus the use of the steering assembly becomes more versatile.

The other objective of the invention is to provide an improved steering assembly, wherein the front steering bar has a length longer than that of the rear steering bar. Accordingly, when the front steering bar and the rear steering bar pivot relative to the base, the frame will pivot relative to the front steering bar and the rear steering bar. The headlight mounted on the frame also rotates when the steering assembly is adjusted. This can control the angle of the light projected from the headlight to a desired range. The illuminating effect of the headlight is improved.

Other objects, advantages and novel features of the invention will become more apparent from the following detailed description when taken in conjunction with the accompanying drawings.

DETAILED DESCRIPTION OF PREFERRED EMBODIMENT

Figure 1:
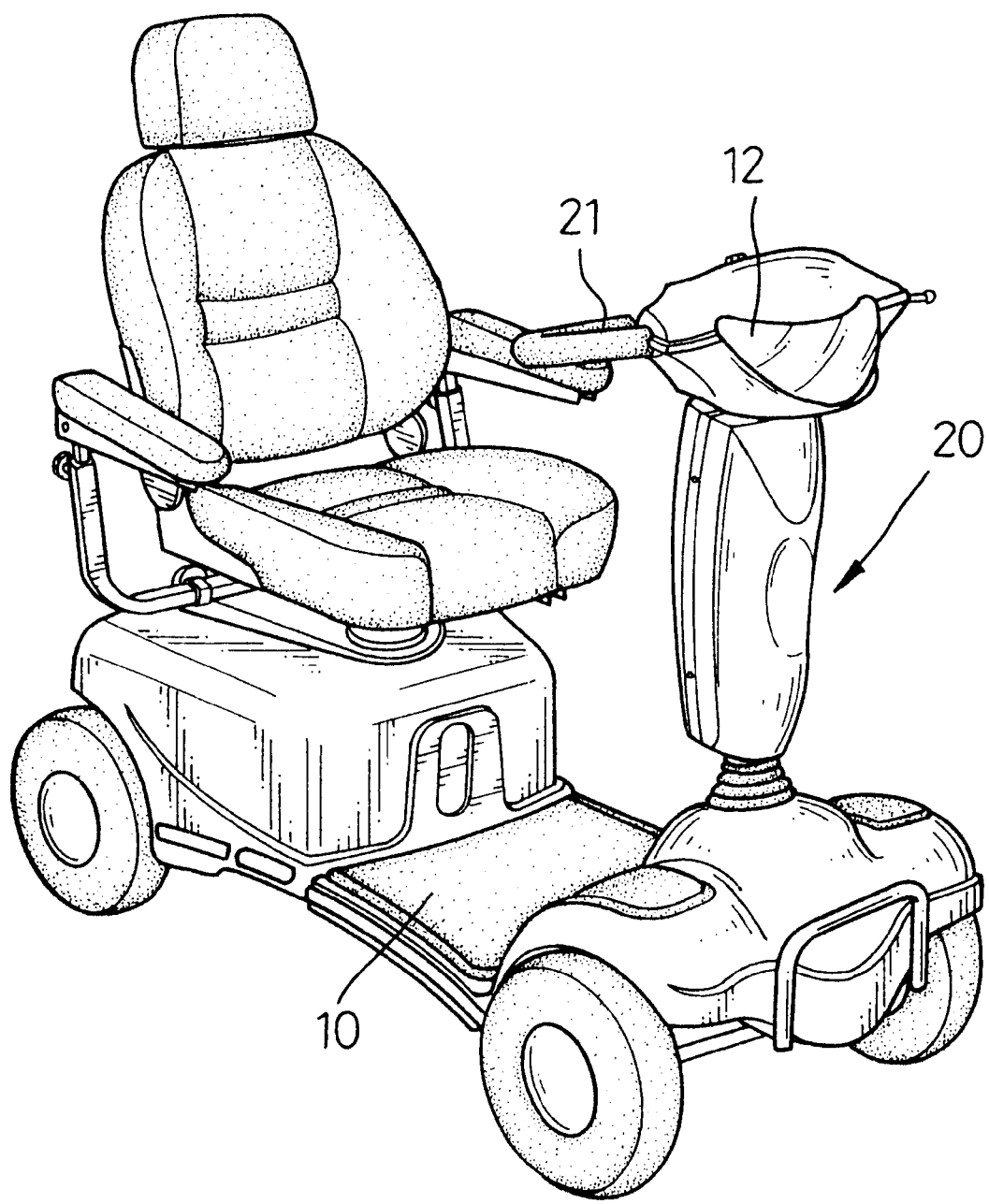
FIG. 1 is a perspective view of an electrical scooter with a steering assembly in accordance with the present invention.
Figure 2:
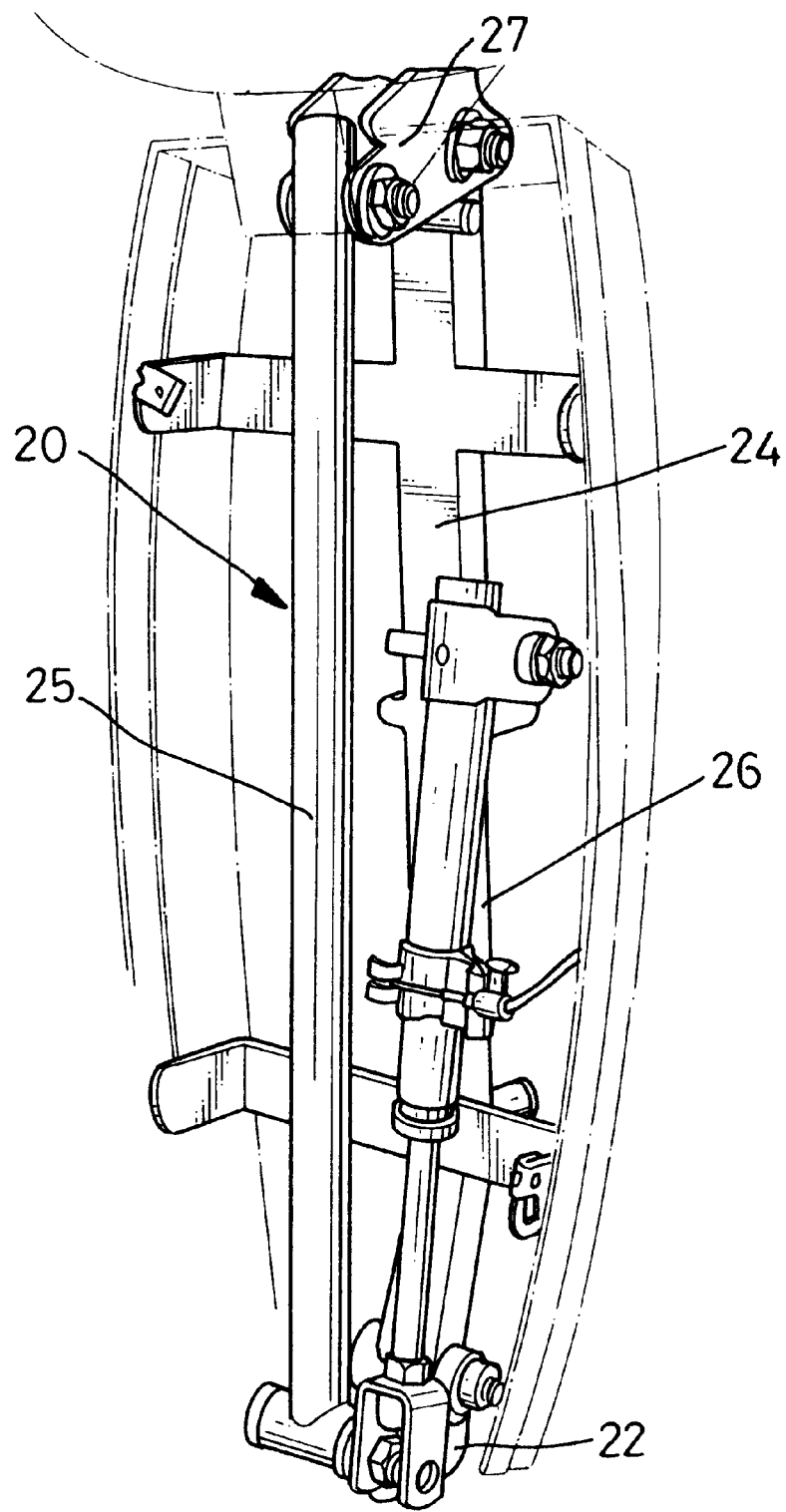
FIG. 2 is a perspective view of the steering assembly in FIG. 1.
Figure 3:
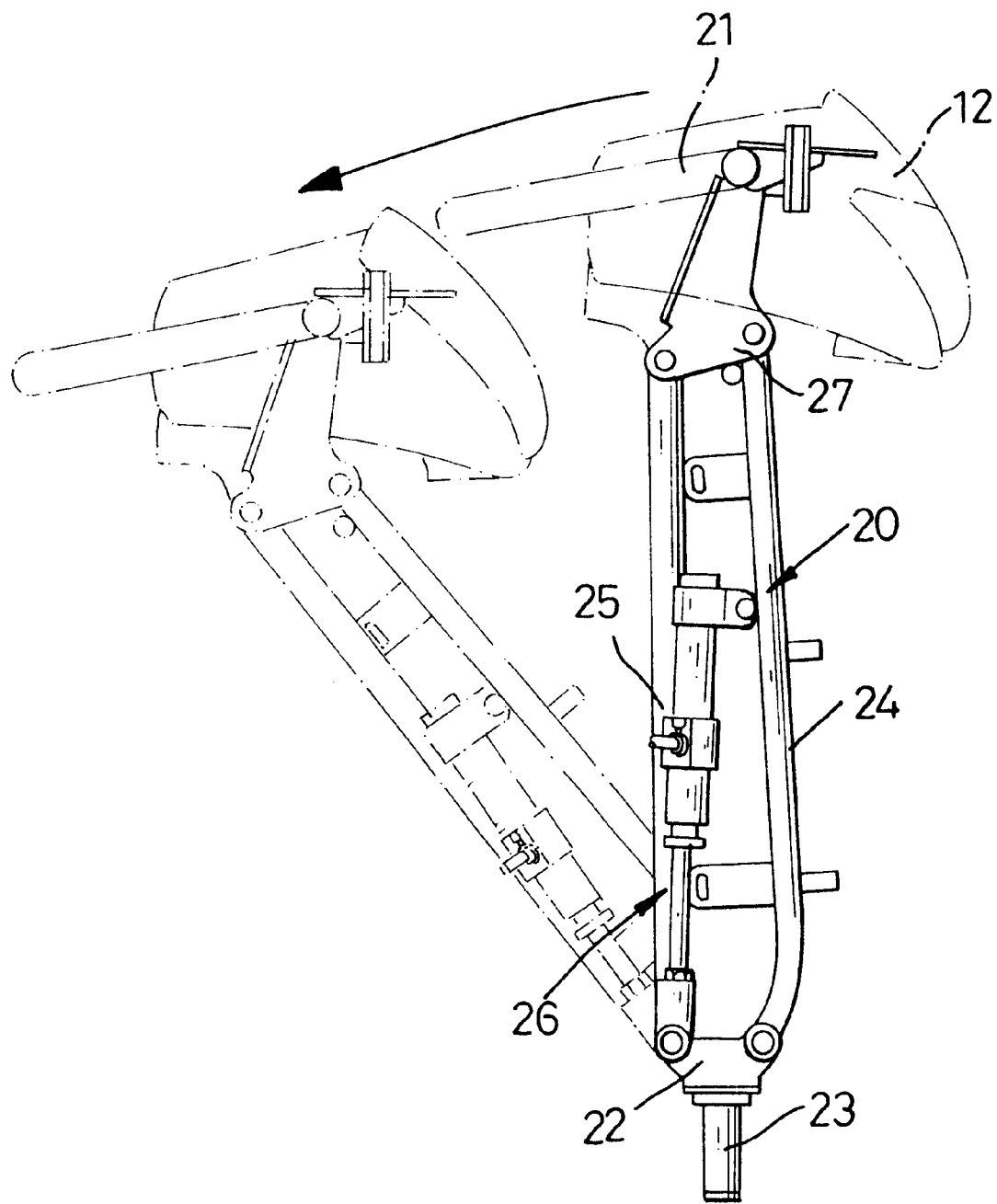
FIG. 3 is a side plan view of the steering assembly in FIG. 2.
Figure 5:
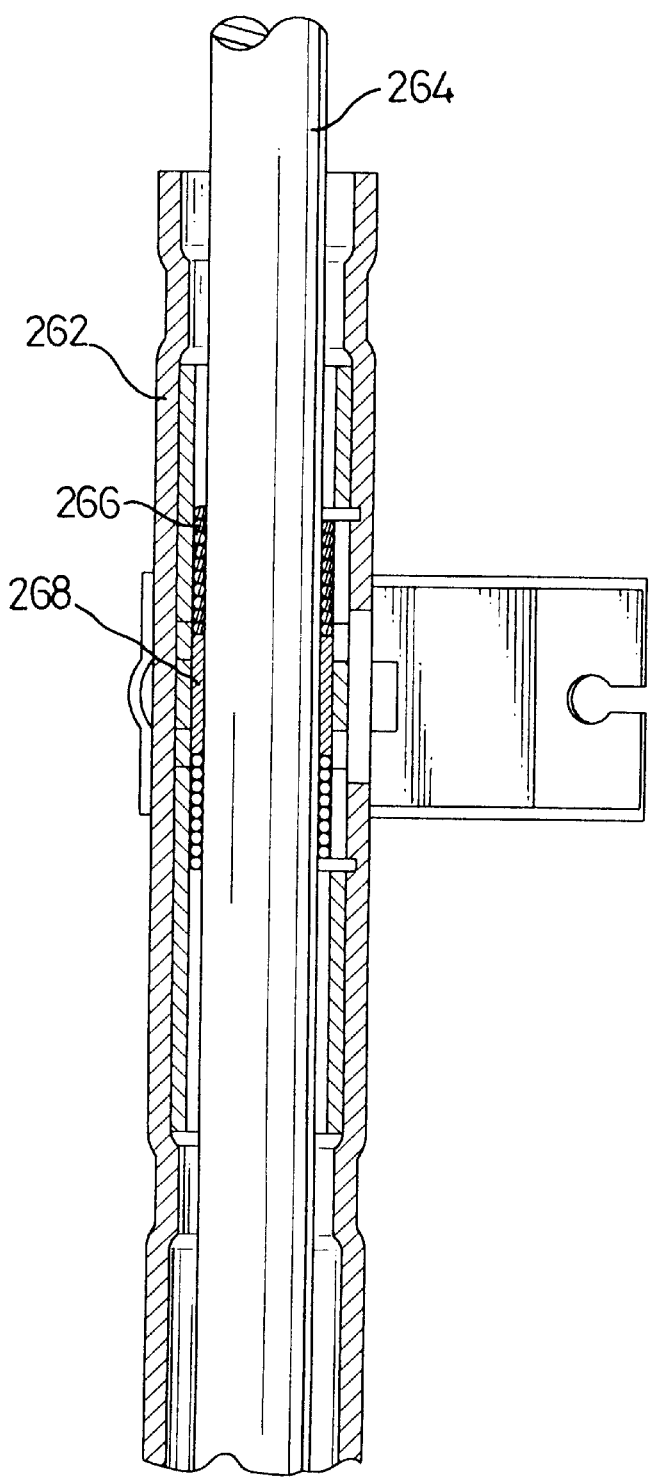
FIG. 5 is a side plan view in partial cross section of the positioning device in FIG. 1.
Figure 6:
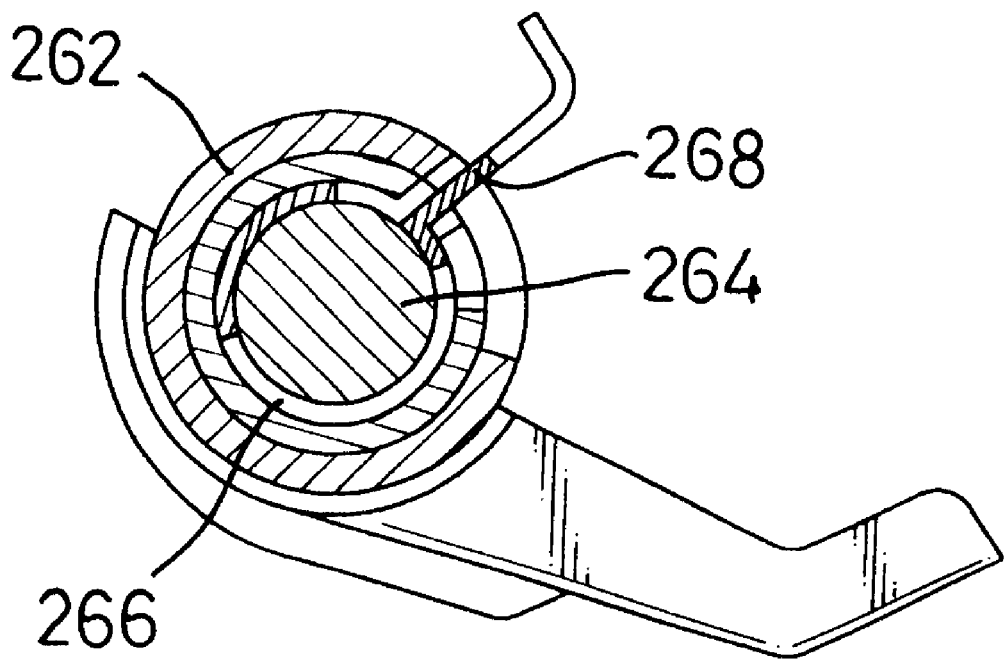
FIG. 6 is a top plan view in partial cross section of the positioning device in FIG. 5.

With reference to FIGS. 1 to 3, a steering assembly (20) for an electrical scooter in accordance with the present invention comprises a base (22), a connecting tube (23), a front steering bar (24), a rear steering bar (25), a positioning device (26), a frame (27) and a handle (21). The base (22) is rotatably attached to the body (10) of the electrical scooter. The connecting tube (23) is attached to the bottom of the base (22) and connected to the front wheel of the scooter. The front steering bar (24) is pivotally attached to the top of the base (22) and extends upward from the base (22). The rear steering bar (25) is pivotally attached to the top of the base (22) and extends upward from the base (22). In practice, the length of the front steering bar (24) is longer than that of the rear steering bar (25). The positioning device (26) is pivotally mounted between the front steering bar (24) and the rear steering bar (25) to keep the front steering bar (24) and the rear steering bar (25) from pivoting relative to the base (22). In practice, with reference to FIGS. 2, 5 and 6, the positioning device (26) includes a first tube (262), a second tube (264) and a positioning element. One end of the first tube (262) is connected to the front steering bar (24). One end of the second tube (264) is connected to the rear steering bar (25), and the other end of the second tube (264) is slidably inserted into the other end of the first tube (262). The positioning element is mounted in the first tube (262) to stop the second tube (264) from sliding relative to the first tube. The positioning element substantially comprises two springs (266) tightly mounted around the second tube (264). A tab (268) is moveably received in the first tube (262) and extends out from the first tube (262). The tab (268) abuts one end of each spring (266) and is connected to a cable that is connected to a handle. The other end of each spring (266) is securely connected to the first tube (262). Accordingly, the second tube (264) can be kept from sliding relative to the first tube (262) by means of the friction provided by the springs (266), and the gap defined between the front steering bar (24) and the rear steering bar (25) is maintained. Consequently, the front steering bar (24) and the rear steering bar (25) will not pivot relative to the base (22) by means of the positioning effect provided by the positioning device (26).

When the user presses the handle and the tab (268) is moved with the transmission of the cable, the tab (268) will push the end of the springs (266) to twist the springs (266) and the diameter of each spring (266) will be enlarged. Accordingly, the second tube (264) will be released from the springs (266), and can slide relative to the first tube (262).

The frame (27) is pivotally connected to the top of the front steering bar (24) and the rear steering bar (25). A headlight (12) is secured to the frame (27). The handle (21) is laterally secured to the frame (27).

Figure 4:
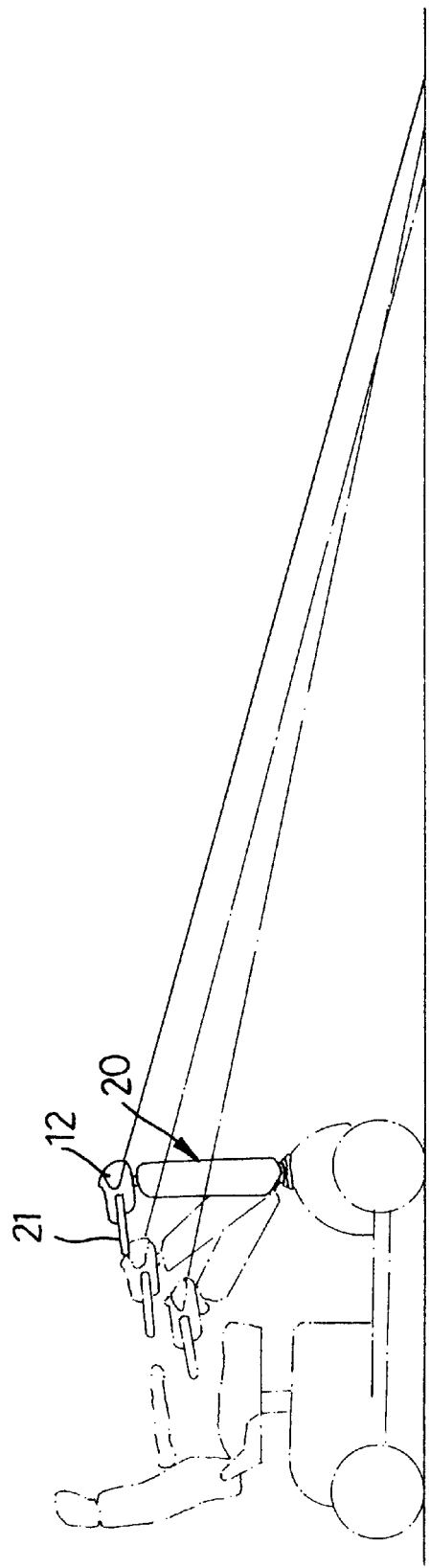
FIG. 4 is a schematic view of the electrical scooter with the steering assembly in FIG. 1 showing that the headlight mounted on the steering assembly projects the light to a desired range.

With reference to FIGS. 2 to 4, when the positioning element of the positioning device (26) is released, the second tube (264) can slide along the first tube (262). The gap between the front steering bar (24) and the rear steering bar (25) is adjustable so that the front steering bar (24) and the rear steering bar (25) can pivot relative to the base (22). Consequently, the steering assembly (20) can pivot relative to the body (10) of the electrical scooter. The handle (21) can be adjusted to be close to or be far from the user sitting on the seat. When the handle (21) is moved to a desired position, the positioning element is then locked. The front steering bar (24) and the rear steering bar (25) are held again, and the handle (21) is positioned to a desired position for different users such that the use of the steering assembly (20) is very versatile.

In addition, because the length of the front steering bar (24) is longer than that of the rear steering bar (25), the frame (27) will pivot relative to the horizon as the steering assembly (20) is adjusted. The headlight (12) will rotate with the frame (27) relative to the front steering bar (24) and rear steering bar (25), and the headlight (12) can be kept from pivoting upward. Consequently, the projecting angle of the light projected from the headlight (12) can be controlled into a desired range. The headlight (21) can still provide a good illuminating effect for the user even when the position and the angle of the steering assembly (20) have been changed.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjustable steering assembly for an electrical scooter comprising:

a base;

a connecting tube attached to a bottom of the base and adapted to be connected to a front wheel of the electrical scooter;

a front steering bar pivotally attached to a top of the base and extending upward from the base;

a rear steering bar pivotally attached to the top of the base and extending upward from the base;

a positioning device pivotally connected between the front steering bar and the rear steering bar to keep the front steering bar and the rear steering bar from pivoting relative to the base, said positioning device having a first tube with one end pivotally connected to the front steering bar, a second tube with one end pivotally connected to the rear steering bar and the other end slidably inserted into the first tube, and a positioning element mounted on the first tube to keep the second tube from sliding relative to the first tube so as to keep the front steering bar and the rear steering bar from pivoting relative to the base, said positioning element comprising two springs tightly mounted around the second tube, each spring having one end securely connected to the first tube and a tab moveably received in the first tube and extending out from the first tube, the tab abutting the end of each spring and connected to a cable that is connected to a handle;

a frame pivotally connected to a top of the front steering bar and a top of the rear steering bar and configured for a headlight to be attached to the frame; and a handle laterally secured to the frame, wherein the front steering bar has a length longer than that of the rear steering bar so that the frame pivots relative to the front steering bar and the rear steering bar while the steering assembly is adjusted, the angle of a light projecting from the headlight being controlled to a desired range.

* * * * *